(12) United States Patent
Kulp

(10) Patent No.: US 9,385,993 B1
(45) Date of Patent: Jul. 5, 2016

(54) MEDIA FOR DETECTING COMMON SUSPICIOUS ACTIVITY OCCURRING ON A COMPUTER NETWORK USING FIREWALL DATA AND REPORTS FROM A NETWORK FILTER DEVICE

(71) Applicant: XL Associates, Inc., Vienna, VA (US)

(72) Inventor: Philip Kulp, Severn, MD (US)

(73) Assignee: XL Associates, Inc., Vienna, VA (US)

( * ) Notice: Subject to any disclaimer, the term of this patent is extended or adjusted under 35 U.S.C. 154(b) by 0 days.

(21) Appl. No.: 14/820,257

(22) Filed: Aug. 6, 2015

(51) Int. Cl.
*G06F 12/16* (2006.01)
*H04L 29/06* (2006.01)

(52) U.S. Cl.
CPC ........ *H04L 63/0227* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 8,402,002 | B2 * | 3/2013 | Adam | G06F 21/552 707/688 |
| 8,555,388 | B1 * | 10/2013 | Wang | H04L 63/1416 709/245 |
| 2004/0193943 | A1 * | 9/2004 | Angelino | H04L 63/1408 714/4.1 |
| 2009/0178139 | A1 * | 7/2009 | Stute | H04L 63/1433 726/22 |
| 2015/0186645 | A1 * | 7/2015 | Aziz | G06F 21/56 726/23 |

* cited by examiner

*Primary Examiner* — Brandon Hoffman
(74) *Attorney, Agent, or Firm* — Cooley LLP

(57) ABSTRACT

Some embodiments described herein relate to a method including receiving a report of a first suspicious activity from a network filter device. The report of the first suspicious activity can include an indication of a time associated with the first suspicious activity and can be devoid of an address uniquely associated with the first suspicious activity. An indication of a user device associated with the first suspicious activity can be identified based on user activity data received from a firewall log. A second suspicious activity can also be identified from the user activity data without receiving a report of the second suspicious activity from the network filter device. A common suspicious activity including the first suspicious activity and the second suspicious activity can be defined, and a report indicating the common suspicious activity can be sent to an administrator device.

24 Claims, 4 Drawing Sheets

MEDIA FOR DETECTING COMMON SUSPICIOUS ACTIVITY OCCURRING ON A COMPUTER NETWORK USING FIREWALL DATA AND REPORTS FROM A NETWORK FILTER DEVICE

BACKGROUND

Some embodiments described herein relate to observing operating characteristics of a computer network, for example, by monitoring automated suspicious activity reports generated by network filter device. When suspicious activity is detected, data from a firewall can be gathered and additional suspicious events can be identified. Suspicious events can be grouped or characterized, and a report can be generated and sent, for example, to an analyst.

Many computer networks contain confidential or sensitive data that provides a ripe target for criminals and spies. Therefore network administrators should be aware of activities on their network which can lead to and/or provide indications of a breach. In large organizations and/or on high-traffic networks, however, suspicious behavior may be very difficult for network administrators to identify.

A number of tools have been developed to assist network administrators to observe operating characteristics of a computer network. Some tools developed for private and/or relatively small networks involve deep access to network traffic, for example, to monitor for real-time traffic patterns or threat behaviors. Such tools are inappropriate for some networks, however, such as particularly large networks or networks where the operation of such intrusive monitoring presents its own unacceptable security risks. Networks operated by governmental agencies, for example, are generally unsuitable for such tools.

The United States Computer Emergency Readiness Team (US-CERT) has developed an intrusion detection system known as Einstein, Einstein 3 Accelerated, or $E^3A$ to assist governmental agencies in monitoring their networks. $E^3A$ is operable to detect suspicious behavior on a network, such as an attempt by a networked computer to access a suspicious internet location. Every time $E^3A$ detects a suspicious activity, it generates an automatic email message intended to alert network administrators. The automatic email messages, however, are often voluminous and unsuitable for identifying patterns of suspicious behavior. A need therefore exists for systems, methods, apparatus, and media for detecting and observing operating characteristics of a computer network using alert messages from a network filter device, such as $E^3A$, and additional data, such as firewall data, which can be used to detect patterns of suspicious behavior, identify previously undetected suspicious behavior, provide summary reports of suspicious behavior, etc.

DETAILED DESCRIPTION

Figure 1:
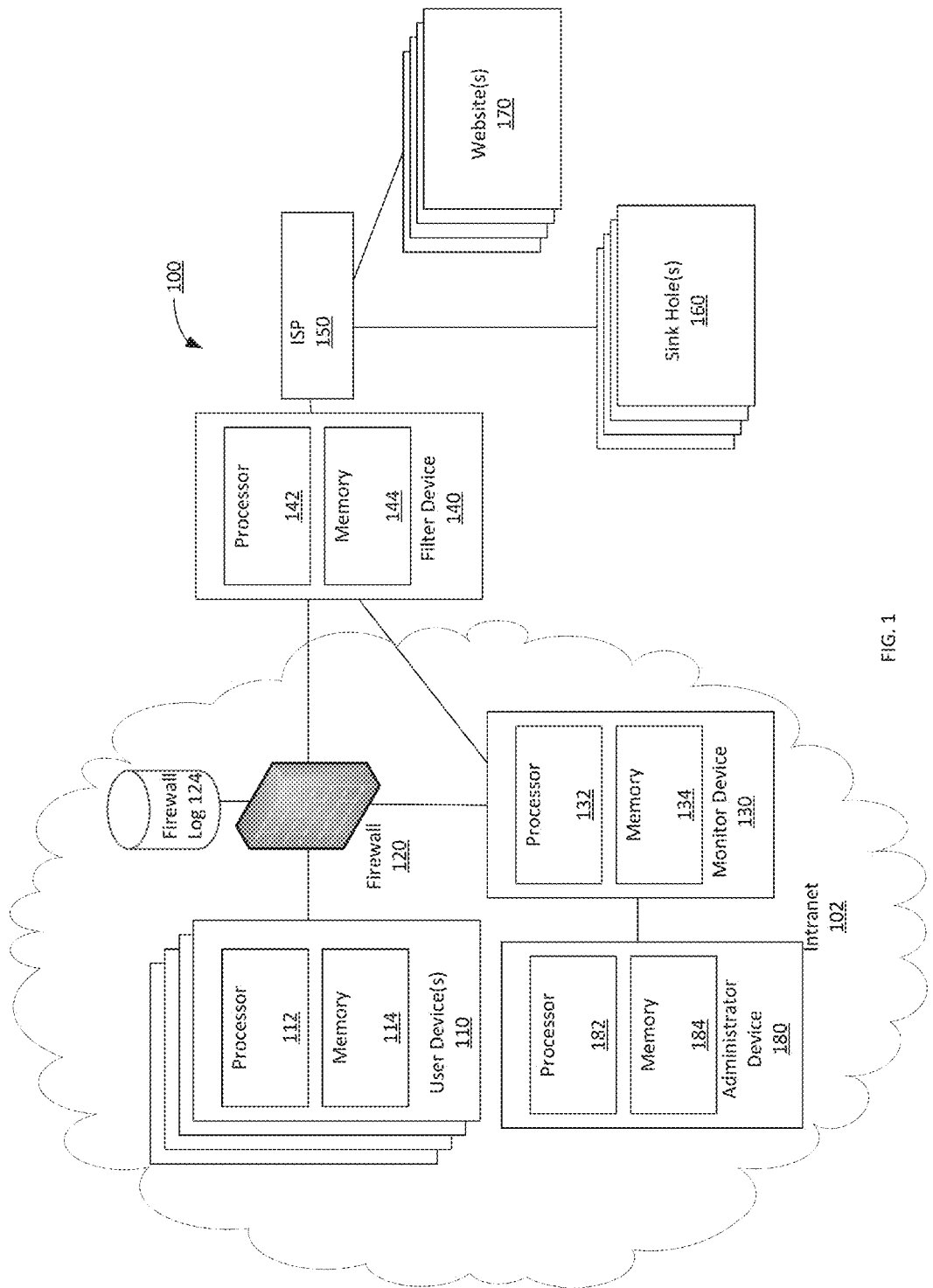
FIG. 1 is a schematic diagram of a system for detecting and observing operating characteristics of a computer network, according to an embodiment.

Some embodiments described herein relate to a method including receiving a report of a first suspicious activity from a network filter device. The report of the first suspicious activity can include an indication of a time associated with the first suspicious activity and can be devoid of an address uniquely associated with the first suspicious activity. User activity data associated with a time period including the time associated with the suspicious activity can be requested from a firewall log. An indication of a user device associated with the first suspicious activity can be identified based on the user activity data received from the firewall log. A second suspicious activity can also be identified from the user activity data. The second suspicious activity can be identified without receiving a report of the second suspicious activity from the network filter device. The report of the first suspicious activity does not include an address uniquely associated with the second suspicious activity. A common suspicious activity including the first suspicious activity and the second suspicious activity can be defined, and a report indicating the common suspicious activity can be sent to an administrator device. In this way, the administrator device may receive a single report of the common suspicious behavior, rather than individual reports of the first suspicious activity and the second suspicious activity.

Some embodiments described herein relate to receiving a report of a first suspicious activity and a report of a second suspicious from a network filter device. The first suspicious activity and the second suspicious activity can each be associated with one or more user devices attempting to access a network location. The report of the first suspicious activity and the report of the second suspicious activity can each include a common reference number such that the first suspicious activity and the second suspicious activity can be associated based on that common reference number. The report of the first suspicious activity and the report of the second suspicious activity may be devoid of an address associated with the network location. User activity data can be received from a firewall log, which can be used to generate a report of a common suspicious activity and/or identify the one or more user devices engaged in the common suspicious activity. The report can be sent to an administrator device such that the administrator does not receive individual reports of the first suspicious activity and the second suspicious activity.

Some embodiments described herein relate to receiving a report of a first suspicious activity and a report of a second suspicious from a network filter device. The first suspicious activity and the second suspicious activity can each be associated with one or more user devices attempting to access a network location. The report of the first suspicious activity and the report of the second suspicious activity can each include a common reference number such that the first suspicious activity and the second suspicious activity can be associated based on that common reference number. Activity data indicating a first user device is associated with the first suspicious activity and a second user device associated with the second suspicious activity can be received from a firewall log and used to identify a common intended destination accessed by the first user device and the second user device. In some instances, the common intended destination may not be the network location that the one or more user devices attempted to access triggering the report of the first suspicious activity and the report of the second suspicious activity. Additional data can be requested from the firewall log associated with the common intended destination, and a third user device can be identified based on the third user accessing (or attempting to access) the common intended destination. A report of the third user device can be sent to an administrator device. The report of the third user device can indicate that the third user device accessed (or attempting to access) the common intended destination as a suspicious behavior. The report can further include a pattern of activity including the first user device, the second user device, and/or the network location attempted to be accessed by the first user device and the second user device.

The report of the first suspicious activity and the report of the second suspicious activity may be devoid of an address associated with the network location. User activity data can be received from a firewall log, which can be used to generate a report of a common suspicious activity and/or identify the one or more user devices engaged in the common suspicious activity. The report can be sent to an administrator device such that the administrator device does not receive individual reports of the first suspicious activity and the second suspicious activity.

FIG. 1 is a schematic diagram of a system 100 for detecting and observing operating characteristics of a computer network, such as an intranet 102, according to an embodiment. As described in further detail herein, the system 100 includes one or more user devices 110 behind a firewall 120. A filter device 140 and a monitor device 130 can be operable to detect and/or observe operating characteristics of the intranet 102. An administrator can use an administrator device 180 to observe operating characteristics of the intranet 102. An internet service provider (ISP) 150 can be operable to route traffic generated by the user device(s) 110 (e.g., outgoing and/or incoming data) to external network locations, such as website(s) 170. For example, the ISP 150 can provide domain name system (DNS) services, translating network requests by user devices 110 to internet protocol (IP) addresses associated with web servers and/or websites 170 and/or domain sink holes 160.

Some embodiments described herein relate to detecting and observing operating characteristics of a computer network. A computer network can be any two or more communicatively linked computing entities. For example, the user devices 110 can form part of the intranet 102 (or internal network) separated from an external network (such as the internet). In some instances, the firewall 120, filter device 140 and/or the monitor device 130 can be operable to monitor traffic entering and/or leaving the intranet 102, such as requests to access an external network location (such as a website 170). In some instances, the firewall 120, filter device 140 and/or monitor device 130 can be operable to monitor intranet 102 traffic, (e.g., communications between user devices 110 and/or communications between user devices 120 and an internal server (not-shown)). The administrator device 180 can be operable to receive reports associated with operating characteristics of the intranet 102 and/or request information associated with operating characteristics of the intranet 102 from the monitor device 130 and/or the firewall 120.

The user devices 110 can each be any suitable computing entity, such as a desktop computer, a laptop computer, a tablet computer, a smartphone, etc. Each user device 110 can include a processor 112 and/or a memory 114. The processor 112 can be for example, a general purpose processor, a Field Programmable Gate Array (FPGA), an Application Specific Integrated Circuit (ASIC), a Digital Signal Processor (DSP), and/or the like. The processor 112 can be configured to retrieve data from and/or write data to memory, e.g., the memory 114, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

Each user device 110 can be operable to send data to and/or receive data from one or more network locations. As one example, a user device 110 can be operable to request content from another user device 110 and/or an intranet server (not shown). As another example, a user device 110 can be operable to send data to and/or receive data from an internet source, such as a website 170 and/or webpage (e.g., stored on a webserver). For example, a user can direct a web browser (stored in memory 114 and/or executing on the processor 112) to access a network location by entering a universal resource locator (URL or "web address") into an address bar. As described in further detail herein, the request can be sent through the firewall 120 and the filter device 140, and received by the ISP 150. The ISP 150 can translate the URL into an IP address and pass the request through to the requested website 170 (residing on a webserver) associated with that URL.

The firewall 120 can be any suitable hardware and/or software firewall and/or other suitable access control device, such as a proxy server, gateway, etc. For example, networking equipment, such as a router or switch can include a hardware and/or software firewall module. As another example, the firewall can be implemented in software (stored in memory and/or executing on a processor) of an intranet server (not shown) disposed between the intranet and an outside computer network.

The firewall 120 can be operable to apply rules to block traffic passing to and/or from the user devices 110. The firewall 120 can also be operable to observe traffic passing to and/or from the user devices 110 and can store a record of traffic in a firewall log 124. The firewall log 124 can be maintained in any suitable memory, which can be similar to the memory 114. The firewall log can be co-located with the firewall 120 and/or located separately from the firewall 120. The firewall log 124 can include records of the origin of and the intended destination of traffic going to and/or leaving from the user devices 110. For example, when a user device 110 requests a website 170, the firewall log 124 can store a record indicating (1) which user device 110 requested the website 170, (2) which website 170 was requested, (3) the time the request was made, (4) the size a data transfer associated with the request of a website (e.g., the size of the request itself, the size of data sent to the user device 110 in response to the request, and/or the size of data sent to the website in response to accessing the website), and/or any other suitable information.

The filter device 140 includes a processor 142 and a memory 144, which can be similar to the processor 112 and/or memory 114, respectively. As shown, the filter device 140 is external to the intranet 102. Similarly stated, the filter device 140 can be a third party device (i.e., not under the control of an administrator of an intranet 102 including the user devices 110 and the firewall 120). When the filter device 140 is a third party device, the administrator of the intranet 102 may not receive advanced analytics from the filter device 140 and/or may not be able to query the filter device 140 for additional information.

The filter device 140 can be operable to detect when a user device 110 requests content from a website 170. For example, traffic from the user device 110 can be received by the filter device 140 after passing through the firewall 120. In some instances, the filter device 140 can be operable to store (e.g., in memory 144) and/or execute an intrusion detection service (e.g., on the processor 142), such as $E^3A$. As described in further detail herein, the filter device 140 can be operable to apply a blacklist or any other suitable technique to detect suspicious activity, such as a user device 110 requesting to access a website 170. In some instances, however, the administrator of the intranet 102 may not be privy to the contents of the blacklist or other filtering criteria. In such circumstances, it may be difficult and/or impossible for the administrator of the intranet 102 to evaluate whether activity identified by the filter device 140 is suspicious for the intranet 102 and/or the seriousness of the activity. Similarly stated, the filter device 140 may consider an attempt to access www.hacker.com to be a suspicious activity. If, however, a user device 110 is used for computer security research, such an attempt to access www.hacker.com may be benign activity for the intranet.

When the filter device 140 detects suspicious activity, the filter device 140 and/or the ISP 150 can divert the activity from its intended destination (e.g., a website 170) to a sinkhole 160. The sinkhole 160 can be a non-content filler page served to the requesting user device 110 by the ISP 150 and/or by a DNS server operated by the ISP 150. In some instances, the filter device 140 generates automated reports indicating when a suspicious activity occurs. Such an automated report can be, for example, an email and can contain limited information, such as a time associated with a suspicious activity (e.g., the time a suspicious request to access a website is received by the filter device, a time associated with a report generated by the filter device, a time associated with a timestamp included in the suspicious request, etc.), an address associated with the sinkhole 160, and a reference number. An example of an automated report is shown below, where "date/time" represents the time the suspicious activity was observed; "proto" represents the protocol of the suspicious activity, in this case "TCP" or transmission control protocol; "safe hit srcip" is the source of the suspicious activity, which may be an IP address associated with the firewall 120; "srcport" is the source port; "destip" is an IP address assigned by the filter device 140 and/or the ISP 150 associated with the sinkhole 160; "destport" is the destination port; "customer DNS lookup scrip" is an IP address assigned by the ISP 150 associated with the sinkhole 160; and "ref#," is a reference number assigned by the filter device 140 associated with the requested suspicious location.

DATE/TIME (UTC)=12/1/2014 11:07:10
PROTO=TCP
SAFE HIT SRCIP=100.100.101.23
SRCPORT=7555
DESTIP=1.2.3.4
DESTPORT=80
CUSTOMER DNS LOOKUP SRCIP=10.8.8.12
REF#=abcd1234

In some instances, such as the example provided above, the report can substantially consist of a time associated with a suspicious activity, and address associated with the sinkhole 160 and a reference number. Similarly stated, the report may not include any substantive information other than a time associated with a suspicious activity, and address associated with the sinkhole 160 and a reference number (email headers, port identifiers, protocols, and similar metadata not being considered substantive information).

For example, $E^3A$'s filtering algorithms, blacklist, and other information may be partially proprietary. Reports generated by the filter device 140 executing $E^3A$ (or similar traffic monitoring technology) may be configured or arranged so as to not reveal filtering criteria, blacklist content, and so forth. For example, a report generated by the filter device 140 may not include the URL or IP address of the suspicious website 170. Thus, reports generated by the filter device 140 can be suitable for identifying a single instance of suspicious behavior, but may not be adequate to identify patterns of suspicious behavior.

The monitor device 130 includes a processor 132 and a memory 134. The monitor device 130 can be operable to receive reports of suspicious activity generated by the filter device 140, for example by monitoring an email inbox. As described in further detail herein, the monitor device 130 can be operable to define associations between suspicious activity reports and/or query the firewall log 124 to gather additional information associated with suspicious activity. For example, in some instances, the monitor device 130 can be operable to identify one or more user devices 110 attempting to access common suspicious website 170. For instance, upon receiving a notification from the filter device 140 that a suspicious activity has occurred, the monitor device 130 can query the firewall log 124 and obtain information such as the identify of the user device 110 and/or information suitable to identify the intended destination (a suspicious website 170). Upon receiving a subsequent notification from the filter device 140 that a suspicious activity has occurred, the monitor device can again query the firewall log 124. In the event the same user device 110 and/or the same intended destination is received (e.g., within a period of time, such as 10 minutes, 24 hours, 7 days, etc.) the monitor device 130 can identify a common suspicious activity.

The monitor device 130 can further be operable to generate reports of patterns of suspicious activity and/or identify root causes of suspicious activity. For example, the monitor device 130 can be operable to identify a pattern of suspicious activity associated with a compromise of the internal network by, for example, malware. For example, the monitor device can be operable to identify a pattern of activity associated with an infected user device 110 attempting to access network location(s) associated with known command and control infrastructure used by malware, identify multiple user devices 110 attempting to access one or more common suspicious websites 170, and/or a pattern of a single user device 110 attempting to access one or more suspicious websites 170 over a period of time. The monitor device 130 can be operable to generate reports that identify such patterns of suspicious activity and/or known root causes. For example, if a pattern of suspicious activity matches a profile of known malware (e.g., a profile stored in memory 134), the monitor device can generate a report identifying the malware.

The administrator device 180 can be operable to monitor the intranet 102 (e.g., the user devices 110 and/or the firewall 120). The administrator device 180 includes a processor 182 and a memory 184, which can be similar to the processor 112 and/or the memory 114, described above. The administrative device 180 can be operable to receive reports of suspicious activity from the monitor device 130. In some instances, such a report can be based on more than one instance of suspicious activity from the intranet 102. The administrator device 180 can further be operable to request additional data from the monitor device 130, which can be based on reports sent from the filter device 140 and/or firewall log 124. For example, in response to receiving a report from the monitor device 130 that a user device 110 has engaged in multiple instances of suspicious behavior, an administrator can direct the administrator device 180 to request additional data such as records of other user device(s) 110 engaging in the same suspicious behavior.

Figure 2:
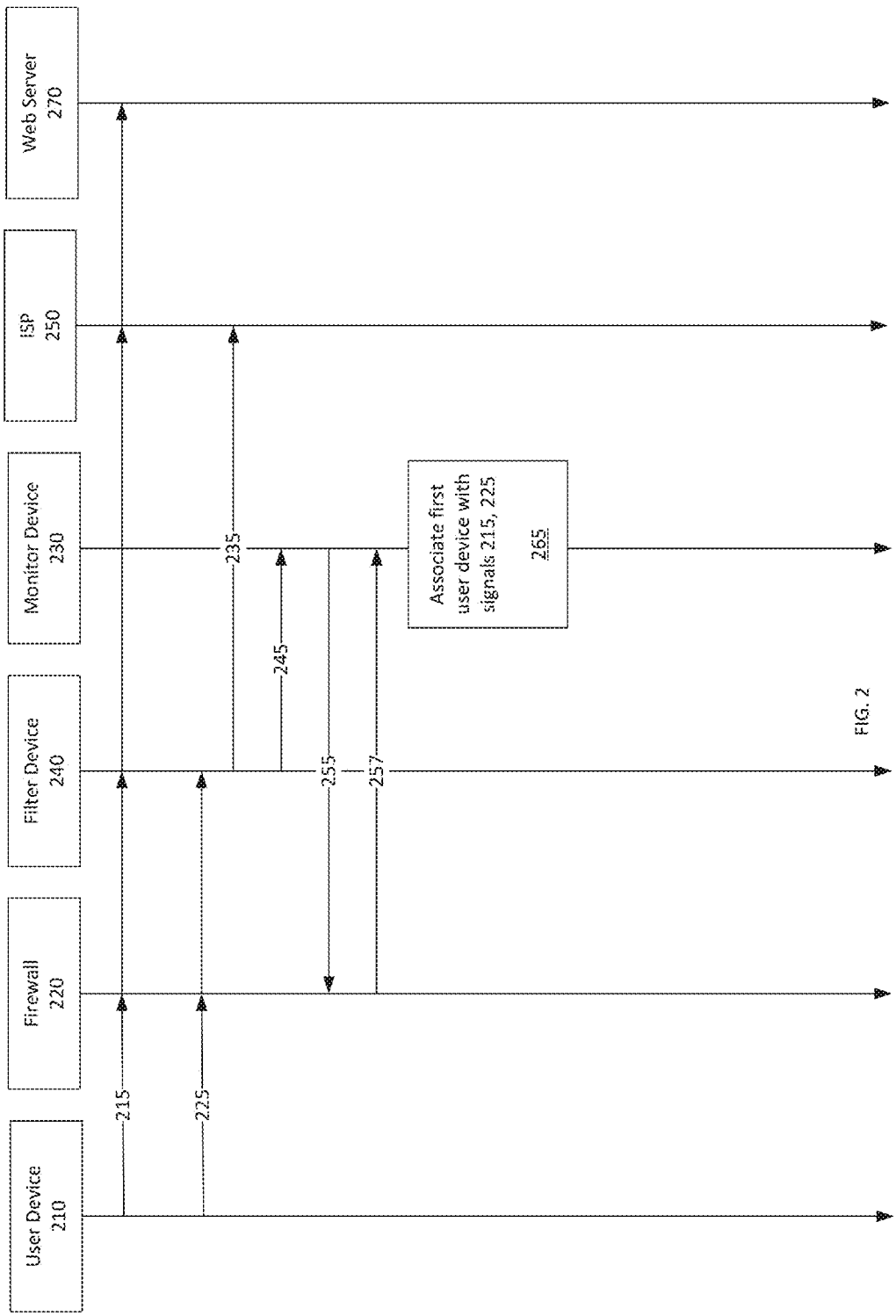
FIG. 2 is a signal diagram illustrating an example of observing operating characteristics of a network.

FIG. 2 is a signal diagram illustrating an example of observing operating characteristics of a network. The signal diagram illustrates communications between a user device 210, a firewall 220, a filter device 240, a monitor device 230, an ISP 270, and a web server 270. The user device 210, the firewall 220, the filter device 240, the monitor device 230, and the ISP 250, can each be structurally and/or functionally similar to the user device(s) 110, the firewall 120, the filter device 140, the monitor device 130, and/or the ISP 150, respectively, as shown and described above. The web server 270 can be a computing entity (having a processor and a memory) operable to host a website, such as a website 170, shown and described above.

The user device 210 requests a website, at 215. For example, a user of the user device 210 can enter a URL into an address bar of a browser executing on the user device 210. As another example, an application and/or malware (stored in a memory and/or executing on a processor of the user device 210) can attempt to access the web server 270 without the user's intervention. The request made, at 215, can pass through the firewall 220, the filter device 240, and the ISP 250 on its way to the web server 270. The firewall 220 can log the request. The filter device 240 can evaluate the request before passing the request on to the ISP 250. For example, the filter device 240 can determine whether the request made at 215 is associated with a blacklisted website or webserver 270. As shown, filter device 240 does not determine that the request made at 215 is suspicious, and passes the request along to the ISP 250. The ISP 250 then routes the request made at 215 to the requested web server 270. Although not shown, the web server 270 can return the requested content to the user device 210.

At 225, the user device 210 can request a second website, which can be different from the website requested at 215. The request made at 225 passes through the firewall 220 and reaches the filter device 240. The filter device 240 can determine that the request made at 225 is suspicious. For example, the request made at 225 can be for a website that is identified on a blacklist maintained by the filter device 240. Rather than passing the request made at 225 on to the ISP 250, the filter device 240 can send a signal to the ISP, at 235 to sinkhole the request 225. Although not shown, in response the ISP 250 (and/or a DNS server operated by the ISP 250) can serve a non-content page to the user device 210.

The filter device 240 and/or the monitor device 230 are operable to determine when a request to access network location(s) is suspicious. Such requests are referred to herein as suspicious requests or suspicious activity. In response to detecting the suspicious request 225, the filter device 240 can generate a report, which can be sent to the monitor device 230, at 245, for example, via email. The report sent at 245 can include the time the suspicious activity was observed, a reference number, and/or an indication of an address associated with the sinkhole. In some instances, the report sent at 245 may not include any additional substantive information. For example, the report sent at 245 may not identify the user device 210 or the intended destination. Similarly stated, the report sent at 245 may be devoid of addresses (e.g., IP addresses, URLs, etc.) uniquely associated the request made at 225. For example, reports sent by $E^3A$ do not contain an address uniquely associated with the suspicious behavior. Furthermore, the filter device 240 may not be configurable to provide such information, particularly when the filter device 240 is a third party device (e.g., relative to an intranet).

In response to receiving the report at 245, the monitor device 230 can request activity data from the firewall 220, at 255, and receive user activity data, at 257. For example, the monitor device 230 can request traffic associated with the time reported at 245 to identify the user device 210 and/or the requested destination. In response, the firewall 220 can return log data associated with that time, which can include information identifying the user device 210.

In some instances, the monitor device 230 can request a page name or uniform resource name. The monitor device 230 may not request the host or uniform locator. Similarly stated, the firewall 220 can be operable to store a uniform resource identifier, such as www.foo.com/bar. The monitor device 230 can be operable to request the page name, "/bar," but not the host name, www.foo.com. In this way, the monitor device 230 can request information suitable to infer that other requests to access network locations having the same page name are suspicious, but this information may not be sufficient to ascertain the contents of the blacklist maintained by the filter device 240.

The monitor device 230 can further request firewall log data for a time period including the time indicated in the report time and before and/or after the time indicated in the report received at 245. For example, if the report received at 245 includes a time stamp of 14:23, the monitor device 230 can request firewall log data between 14:18-14:28 or any other suitable time period. Because suspicious traffic of concern to network administrators frequently occur in patterns, requesting firewall log data for a time period before and/or after the time indicated in the report received at 245 can be used to aid the administrator in reacting to potentially serious network breaches.

In some instances, requesting traffic associated with the time reported at 245 and requesting traffic associated with a time period including the time reported at 245 and before and/or after the time indicated in the report received at 245 can occur simultaneously. In other instances, the monitor device 230 can request additional data from the firewall 220 sequentially after identifying the user device. For example, after identifying the user device 210, the monitor device 230 can request additional log data from the firewall 220 associated with the user device 210 (and not request data for other user devices of an intranet) and/or request additional log data associated with other user devices (not shown) also requesting the uniform resource name.

At 265, the monitor device 230 can be operable to associate the request 215, with the suspicious request 225. For example, based on user device 210 originating the request made at 215 and the request made at 225, the monitor device 230 can define a common suspicious activity. In some instances, request made at 215 can be suspicious activity that was not recognized by the filter device 240. Similarly stated, in the absence of the monitor device 230 defining the common suspicious activity, an administrator of the intranet would not be alerted to the second suspicious request made at 225. For example, an intranet protected only by $E^3A$, would not alert the administrator to the second suspicious request.

In some instances, the request made at 215 and the request made at 225 can form a pattern of suspicious behavior. Such a pattern may be of greater concern to the administrator than a single suspicious activity and/or may point to unsafe user behavior that can be addressed by the administrator. For example, if the user device 210 accesses a compromised or unsafe website, the website may deliver a malicious payload. That malicious payload may cause the user device 210 to attempt to download additional malware, may cause the user device 210 to request instructions from a malware command and control server, and/or may cause the user device 210 to attempt to upload data stored on the user device 210 and/or the intranet. In some instances, the filter device 240 may be operable to detect the user device 210 engaged in suspicious activity caused by a malicious payload, but may not be operable to detect the initial source of the compromise (e.g., the user of the user device 210 requesting a compromised or unsafe website, the user clicking a compromised link in an email message, etc.). At 265, the monitor device 230 can be operable to identify such a source of the compromise (e.g., request made at 215). The monitor device 230 can be operable to inform the administrator of the pattern of suspicious behavior. For example, the monitor device 230 can send a report to an administrator device. In response, the administrator can address the pattern of suspicious behavior, for example, by retraining the user of the user device 210, by training email service filters to block phishing or spear phishing emails similar to the initial source of the compromise, etc.

In some instances, the monitor device 230 can be operable to send a report to an administrator device (not shown in FIG. 2), similar to the administrator device 180. Such a report can summarize or otherwise present a portion of the content received in alerts generated by the filter device 240. Similarly stated, the monitor device 230 can be operable to consolidate and/or reduce the information reported by the filter device 240 such that the monitor device 230 does not report each instance of suspicious behavior individually, does not report isolated instances of suspicious behavior. In some instances, the administrator device 180 and the monitor device 130 can collectively cooperate to personalize reports for an administrator. For example, if an administrator makes a determination that a particular instance of suspicious behavior is not a threat to the operation of the network (e.g., the instance of suspicious behavior is a false positive), the monitor device 130 can be operable to disregard and/or not report future reports from the filter device bearing a hallmark of that activity (e.g., a common reference number.

Figure 3:
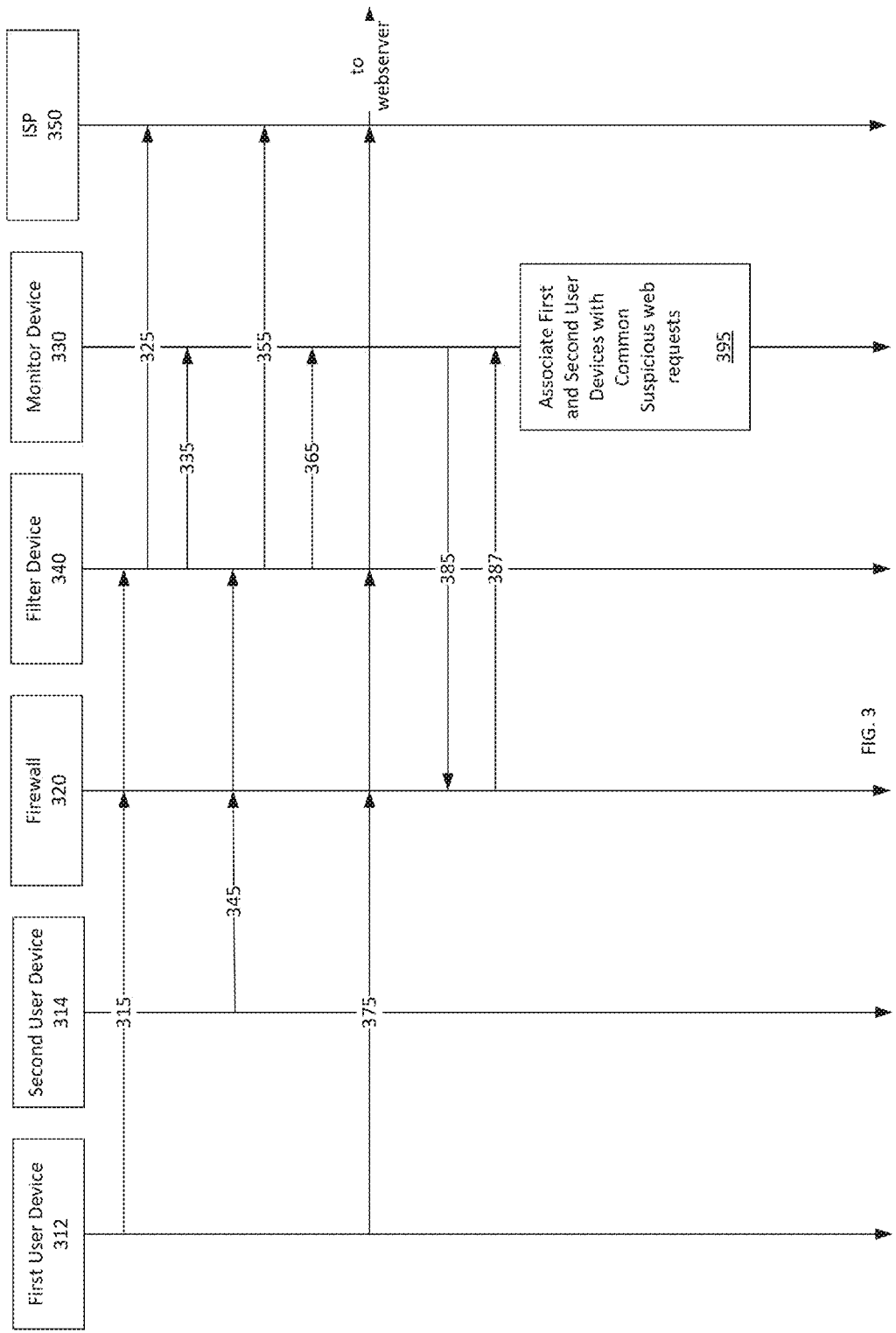
FIG. 3 is a signal diagram illustrating another example of observing operating characteristics of a network.

FIG. 3 is a signal diagram illustrating an example of observing operating characteristics of a network. The signal diagram illustrates communications between a first user device 312, a second user device 322, a firewall 320, a filter device 340, a monitor device 330, and an ISP 350. The user devices 312, 314, the firewall 320, the filter device 340, the monitor device 330, and the ISP 350, can each be structurally and/or functionally similar to the user device(s) 110, the firewall 120, the filter device 140, the monitor device 130, and/or the ISP 150, respectively, as shown and described above.

The first user device 312 initiates a first network request, at 315. The first network request made at 315 can be a suspicious network request, similar to the request made at 225 as shown and described above. The first network request made at 315 passes through the firewall 320 and is identified as suspicious by the filter device 340. The filter device 340 can send a signal to the ISP, at 325 to sinkhole the request made at 315. Although not shown, in response the ISP 350 (and/or a DNS server operated by the ISP 350) can serve a non-content page to the first user device 312.

In response to detecting the suspicious request 315, the filter device 340 can generate a report, which can be sent to the monitor device 330, at 335, for example, via email. The report sent at 335 can include the time the suspicious request made at 315 was observed, a reference number, and/or an indication of an address associated with the sinkhole. In some instances, the report sent at 335 may not include any additional substantive information.

At 345, the second user device 314 initiates a second network request. The second network request 345 can also be a suspicious network request. In some instances, the second network request made at 345 can be a request to access the same network location as requested at 315. Like the first suspicious request 315, the second suspicious request made at 345 passes through the firewall 320 and is identified as suspicious by the filter device 340. The filter device 340 sends a signal to the ISP, at 355 to sinkhole the suspicious request made at 345. In response to detecting the suspicious request made at 345, the filter device 340 sends a report to the monitor device 330, at 365.

At 375, the first user device 312 initiates a third network request. The third network request made at 375 can be similar to the request made at 215, as shown and described above. Similarly stated, the request made at 375 is not identified as a suspicious request by the filter device 340 and passes through to the ISP 350, which forwards the request to a webserver (not shown) associated with the requested content.

At 385, the monitor device 330, can request user activity, for example, in response to receiving reports of suspicious activity at 335 and/or 365. The monitor device 330 can request data from the firewall 320 associated with the time identified in the reports received at 335 and/or 365. In addition or alternatively, the monitor device 330 can request firewall data at 385 for a time period including one or both of the times identified in the reports received at 355 and/or 365. At 387, the monitor device 330 can receive the firewall data.

At 395, the monitor device 330 can be operable to identify patterns of suspicious behavior. For example, the monitor device 330 can be operable to associate the first user device 312 and the second user device 314 based on a pattern in the reports received at 335 and 365 (e.g., based on reports received at 335 and 365 having the same reference number) and/or the firewall data received at 387 (e.g., based on the firewall data indicating that the first user device 312 and the second user device 314 accessed a network location having a common uniform resource name).

By way of contrast, the filter device 340 (e.g., a computing entity running $E^3A$) may not be operable to detect patterns in suspicious behavior. Similarly stated, the filter device 340 may generate an individual report (335, 365) for each instance of suspicious activity. The monitor device 330 can be operable to link the first suspicious request made at 315 to the second suspicious request made at 345. Furthermore, in some instances, the monitor device 330 can be operable to identify the third request made at 375 as suspicious activity, without receiving a report from the filter device 340, based on the link between the first user device 312 and the second user device 314, and/or any suitable patterns in network traffic received from the firewall 320. The monitor device 330 can be further operable to generate a single report associated with the first suspicious activity 315, the second suspicious activity 345, and/or the third network request 375. Grouping instances of a common suspicious activity can improve the ability of an administrator to identify a root cause and/or address the suspicious activity, as compared to the individual reports sent at 335 and 365 and/or improve the operating characteristics of the network, for example, by reducing the quantity of alert messages.

Figure 4:
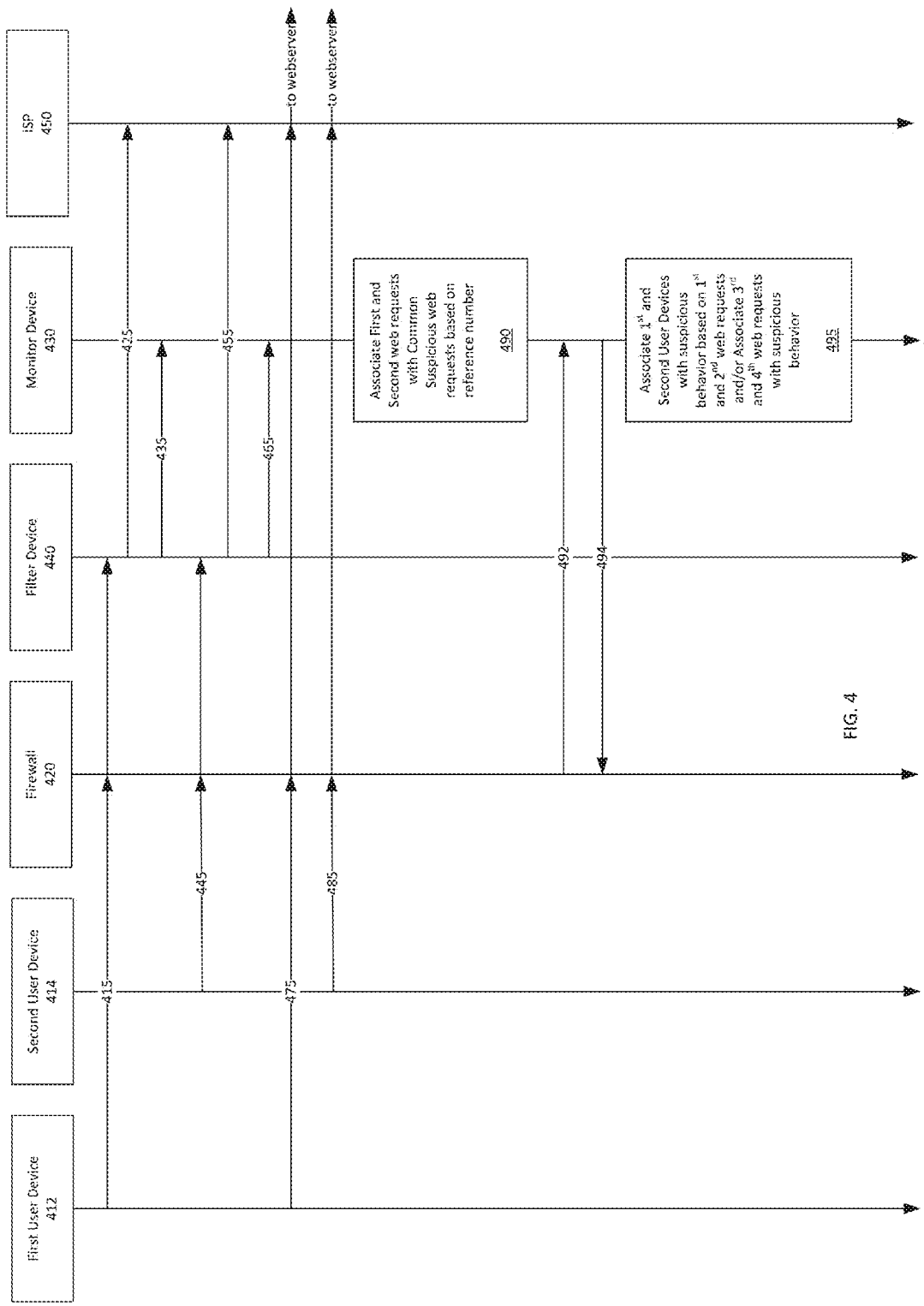
FIG. 4 is a signal diagram illustrating another example of observing operating characteristics of a network.

FIG. 4 is a signal diagram illustrating an example of observing operating characteristics of a network. The signal diagram illustrates the signals exchanges and the processes performed during communications between a first user device 412, a second user device 422, a firewall 420, a filter device 440, a monitor device 430, and an ISP 450. The user devices 412, 414, the firewall 420, the filter device 440, the monitor device 430, and the ISP 450, can each be structurally and/or functionally similar to the user device(s) 110, the firewall 120, the filter device 140, the monitor device 130, and/or the ISP 150, respectively, as shown and described above.

Signals 415, 425, 435, 445, 455, 465, and 475 can represent signals that are similar to signals 315, 325, 335, 345, 355, 365, and 375, respectively. The signal sent at 485 can be a fourth network request similar to request 215, as shown and described above. Similarly stated, the request made at 485 is not identified as a suspicious request by the filter device 440 and passes through the ISP 450, which forwards the request to a webserver (not shown) associated with the requested content. In some instances, the request made at 485 can be a request to access the same network location as request 475. In other instances, the request made at 485 can be a request to access a different network location than request made at 475.

At 490, the monitor device 430 can be operable to associate the first suspicious web request made at 415 with the second suspicious web request made at 445. In some instance, this association can be defined by the monitor device 430 based on a reference number included within reports received at 435, 465. For example, in some instances, the filter device 440 can be operable to assign a reference number that is associated with a suspicious network location. The reference number may not be uniquely associated with a suspicious network location and/or the intended destination may not be determinable based solely on the reference number, but a common reference number may be indicative of commonalities between suspicious web requests 415 and 445. Similarly stated, the monitor device 430, in some instances, can be operable to associate the first suspicious web request 415 with the second suspicious web request 445 without receiving data from the firewall 420.

At 492, the monitor device 430 can request user activity. The monitor device 430 can request data from the firewall 420 associated with the time identified in the reports received at 435 and/or 465. In addition or alternatively, the monitor device 430 can request firewall data at 492 for a time period including one or both of the times identified in the reports received at 455 and/or 465. At 494, the monitor device 430 can receive the firewall data.

At 495, the monitor device can detect patterns of suspicious activity additional to the first user device 412 and the second user device 414 initiating suspicious network requests made at 415 and 445. The monitor device 430 can be operable to associate the third web request made at 475 and/or the fourth web request made at 485 with the suspicious activity, for example if the third web request 475 and the fourth web request 485 are requests to access a common network location. The monitor device 430 can further be operable to send a single report, for example, to an administrator device, indicating patterns of suspicious behavior. Such a report may be operable to identify common patterns of suspicious behavior. For example, a report generated by the monitor device 430 can be operable to identify multiple user devices (e.g., 412, 414) engaged in a common suspicious activity, a user device engaged in repeat suspicious activity, and/or suspicious activity that was not detected by the filter device 440.

While various embodiments have been described above, it should be understood that they have been presented by way of example only, and not limitation. Although various embodiments have been described as having particular features and/or combinations of components, other embodiments are possible having a combination of any features and/or components from any of embodiments where appropriate as well as additional features and/or components. For example, some embodiments describe a user device attempting to access a website. Where user device(s) are described as attempting to access a website, such description should not be understood as being limited to a browser executing on a user device being directed to a webpage. Rather, accessing a webpage, as used herein, can describe a user device sending any data to and/or receiving any data from any network location. For example, a computer virus attempting to retrieve instructions from a command and control server can be considered attempting to access a website for purposes of this application.

Furthermore, some embodiments describe various components of computing entities, such as processors and memories. It should be understood that computing entities may include additional elements, such as network adaptors, input/output modules, and or any other suitable hardware and/or software (stored in memory and/or executing on the processor) to perform any of functions described herein and/or any other suitable function.

Where signal diagrams are described, it should be understood that any device(s) can engage in a method including sending and/or receiving described communications. Where methods are described, it should be understood that the methods can be stored as code in a non-transitory computer readable medium (e.g., a memory). Such code can be configured to cause a processor to execute the method and/or cause the processor to bring about an event. Similarly stated, where methods are described, it should be understood that the methods can be implemented by a computer. Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes including for example some or all of the processes and methods described above. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. A non-transitory processor readable medium storing code representing instructions configured to be executed by a processor, the code comprising code to cause the processor to:

receive, from a network filter device, a report of indicating a first suspicious activity at a time, the report indicating the first suspicious activity devoid of an address uniquely associated with the first suspicious activity and a second suspicious activity;

request, from a firewall log in response to the first report, user activity data associated with a time period including the time;

identify, from the user activity data received from the firewall log, (1) an indication of a user device associated with the first suspicious activity and (2) the second suspicious activity, the second suspicious activity identified without receiving, from the network filter device, a report indicating the second suspicious activity;

define a common suspicious activity including the first suspicious activity and the second suspicious activity; and send, to an administrator device, a report indicating the common suspicious activity such that the administrator device does not receive individual reports of the first suspicious activity and the second suspicious activity.

2. The non-transitory processor readable medium of claim 1, wherein the time period is a first time period including a second time period before the time and a third time period after the time.

3. The non-transitory processor readable medium of claim 1, wherein the second suspicious activity is associated with the user device.

4. The non-transitory processor readable medium of claim 1, wherein:
the user device is a first user device;
the user activity data includes user activity data for the first user device and user activity data for a second user device; and
the second suspicious activity is associated with the second user device.

5. The non-transitory processor readable medium of claim 1, wherein the address uniquely associated with the first suspicious activity is a first address on a blacklist maintained by the network filter device and the second suspicious activity is uniquely associated with a second address requested by the user device, the second address not being on the blacklist.

6. The non-transitory processor readable medium of claim 1, wherein the report indicating the first suspicious activity consists essentially of:
a time associated with the first suspicious activity;
the diversion address; and
a reference number.

7. The non-transitory processor readable medium of claim 1, wherein the report indicating the common suspicious activity includes an indication that malware is responsible for the common suspicious activity.

8. The non-transitory processor readable medium of claim 1, wherein:
the address uniquely associated with the first suspicious activity is a uniform resource identifier including a uniform resource locator and a uniform resource name; and
the user activity data includes a uniform resource locator and is devoid of the uniform resource name.

9. The non-transitory processor readable medium of claim 1, wherein:
a firewall associated with the firewall log is under control of a network administrator; and
the network filter device is not under the control of the network administrator.

10. A non-transitory processor readable medium storing code representing instructions configured to be executed by a processor, the code comprising code to cause the processor to:
receive, from a network filter device, a report of a first suspicious activity, the first suspicious activity associated with a first user device attempting to access a network location, the report of the first suspicious activity including a reference number, the report of the first suspicious activity devoid of an address associated with the network location;
receive, from the network filter device, a report of a second suspicious activity, the report of the second suspicious activity including the reference number;
associate the first suspicious activity and the second suspicious activity based on the first report and the second report each including the reference number;
receive, from a firewall log, user activity data associated with the first user device associated with the first suspicious activity and the second user device associated with the second suspicious activity; and
send, to an administrator device, a report of a common suspicious activity such that the administrator device does not receive individual reports of the first suspicious activity and the second suspicious activity.

11. The non-transitory processor readable medium of claim 10, wherein the second suspicious activity is associated with the second user device attempting to access the network location.

12. The non-transitory processor readable medium of claim 10, wherein the network filter device is configured to not respond to requests for information associated with the first suspicious activity.

13. The non-transitory processor readable medium of claim 10, wherein the report associated with the first suspicious activity and the report associated with the second suspicious activity are emails.

14. The non-transitory processor readable medium of claim 10, wherein:
the reference number is generated by the network filter device in response to the first user device attempting to access the network location; and
the network location cannot be determined based solely on the reference number.

15. The non-transitory processor readable medium of claim 10, wherein the network location is associated with a malware command-and-control server.

16. The non-transitory processor readable medium of claim 10, the code further comprising code to cause the processor to:
request, from the firewall log, the user activity data for a time period including at least one of the first suspicious activity or the second suspicious activity, the user activity data received in response to the request.

17. The non-transitory processor readable medium of claim 10, wherein the network location is associated with a first address, the code further comprising code to cause the processor to:
associate a third suspicious activity with the first suspicious activity and the second suspicious activity based on the activity data without receiving, from the network filter device, a report of the third suspicious activity, the third suspicious activity associated with a third user device accessing a second address requested by the first user device.

18. The non-transitory processor readable medium of claim 10, wherein:
the network location is a location on an internet;
a firewall is associated with the firewall log;
the first user device, the second user device, and the firewall are included within an intranet; and
the network filter device is disposed between the intranet and the internet.

19. A non-transitory processor readable medium storing code representing instructions configured to be executed by a processor, the code comprising code to cause the processor to:
receive, from a network filter device, a report of a first suspicious activity, the report of the first suspicious activity including a reference number assigned by the network filter device, the report of the first suspicious activity devoid of an address uniquely associated with the first suspicious activity;

receive, from the network filter device, a report of a second suspicious activity, the report of the second suspicious activity including the reference number assigned by the network filter device of the second suspicious activity;

receive, from a firewall log, first activity data indicating a first user device is associated with the first suspicious activity and a second user device is associated with the second suspicious activity;

identify a common intended destination of the first user device and the second user device based on the first activity data;

receive, from the firewall log after identifying the common intended destination, second activity data associated with the common intended destination;

identify a third user device associated with a third suspicious activity based on the second activity data including a record of the third user device accessing the common intended destination; and send, to an administrator device, a report of the third user device engaging in the third suspicious activity.

20. The non-transitory processor readable medium of claim 19, wherein the reference number is generated by the network filter device such that the common intended destination cannot be determined based solely on information received from the network filter device.

21. The non-transitory processor readable medium of claim 19, wherein common intended destination is a first common intended destination, the code further comprising code to cause the processor to:

receive, from the administrator device, a request for a report of suspicious activity;

identify a second common intended destination associated with the second originator and the third originator in response to receiving the request for the report of suspicious activity, the second common intended destination different from the first common intended destination, the second common intended destination associated with a fourth suspicious activity; and send, to the administrator device, the report of suspicious activity including an indication of the second common intended destination.

22. The non-transitory processor readable medium of claim 21, further comprising code to cause the processor to:

identify a fourth user device based on the fourth user device accessing the second common intended destination, the fourth report including an indication of the fourth user device.

23. The non-transitory processor readable medium of claim 19, wherein the address uniquely associated with the first suspicious activity is a uniform resource identifier including a uniform resource locator and a uniform resource name, the reference number is associated with the uniform resource locator, the reference number is not uniquely associated with the uniform resource name.

24. The non-transitory processor readable medium of claim 19, wherein:

the first user device, the second user device, and the administrator device are included within an intranet; and the network filter device is independent from the intranet such that the network filter device is not configured to provide information associated with the first suspicious activity to a member of the intranet other than the report of the first suspicious activity.

* * * * *